US008762282B2

(12) United States Patent
Meyer et al.

(10) Patent No.: US 8,762,282 B2
(45) Date of Patent: Jun. 24, 2014

(54) METHOD FOR TRANSFERRING ENCRYPTED USEFUL DATA OBJECTS

(75) Inventors: Oliver Meyer, Baddeckenstedt (DE); Andreas Schmidt, Braunschweig (DE); Markus Trauberg, Velchede (DE)

(73) Assignee: Siemens Aktiengesellschaft, Munich (DE)

( * ) Notice: Subject to any disclaimer, the term of this patent is extended or adjusted under 35 U.S.C. 154(b) by 922 days.

(21) Appl. No.: 12/885,131

(22) Filed: Sep. 17, 2010

(65) Prior Publication Data

US 2011/0007898 A1 Jan. 13, 2011

Related U.S. Application Data

(63) Continuation of application No. 10/595,713, filed as application No. PCT/EP2004/052494 on Oct. 11, 2004, now Pat. No. 7,835,992.

(30) Foreign Application Priority Data

Nov. 7, 2003 (DE) .................................. 103 51 961

(51) Int. Cl.
*G06Q 40/00* (2012.01)
(52) U.S. Cl.
USPC .................. 705/52; 705/51; 705/59; 713/193
(58) Field of Classification Search
None
See application file for complete search history.

(56) References Cited

U.S. PATENT DOCUMENTS

| 5,655,117 | A | * | 8/1997 | Goldberg et al. ..................... 1/1 |
| 6,275,709 | B1 | * | 8/2001 | Do ............................... 455/461 |
| 6,915,425 | B2 | * | 7/2005 | Xu et al. ........................ 713/165 |
| 6,977,909 | B2 | * | 12/2005 | Minborg ....................... 370/260 |
| 7,835,992 | B2 | * | 11/2010 | Meyer et al. ..................... 705/59 |
| 2002/0108049 | A1 | * | 8/2002 | Xu et al. ........................ 713/193 |
| 2002/0138435 | A1 | * | 9/2002 | Williams et al. ................. 705/51 |
| 2004/0008823 | A1 | * | 1/2004 | Kindermann et al. ........ 379/1.01 |

FOREIGN PATENT DOCUMENTS

EP 1028559 8/2000 .............. H04L 12/18

OTHER PUBLICATIONS

Nofal et al, "A Simulation Study of Generic Broadband Wireless Integrated Networks", IEEE Symposium on Personal, Indoor, and Mobile Radio Communications, vol. 1, Oct. 18, 1996, pp. 168-172.*

* cited by examiner

*Primary Examiner* — Robert Niquette
(74) *Attorney, Agent, or Firm* — King & Spalding L.L.P.

(57) ABSTRACT

An apparatus and method for transferring encrypted useful data objects (NDO) to a first telecommunication terminal (TG1), wherein at least one encrypted useful data object is initially transferred from a switching component to the first telecommunication terminal. Time information (SABS) is transferred from the switching component to the first telecommunication terminal indicating up to which moment in time a rights object (RO) associated with the at least one encrypted useful data object will arrive. Once the rights object received by the first telecommunication terminal, the telecommunication terminal checks if the moment in time indicated in the time information has elapsed. If the moment has not elapsed, the first telecommunication terminal issues a signal relating to the receipt of a useful data object via a user interface.

45 Claims, 3 Drawing Sheets

FIG 5

MMS - Receiver notification M-Nind sent by MRS to the MUA;
Rights abject integrated as header field X-Mms-Message-Type: m-notification-ind
    X-Mms-Transaction-ID: TRANSACTION-ID# 1
    From: nutzerA@ operatorA
    X-Mms-Message-Size: XXX (Size of associated MMS-delivery message)
    X-Mms-Content-Location: www.OperatorA.de/mms-inbox/ABCD.1234
    Subject: A DRM-protected object
    X-Mms-DRM-Separate-Delivery: 10 < 129> 300

FIG 6

MMS-delivery message M-Rconf sent from MRS to MUA

X-Mms-Message-Type: m-retrieve-conf
    X-Mms-Transaction-ID: TRANSACTION-ID# 2
    X-Mms-MMS-Version: 1.3
    From: nutzerA@ operatorA
    X-Mms-Content-Location: www.OperatorA.de/mms-inbox/ABCD.12345
    Subject: A DRM-protected object
    X-Mms-DRM-Separate-Delivery: 10 < 129> 290
    Content-Type: application/vnd.oma.drm.content ... Data of the DRM protected object ...

METHOD FOR TRANSFERRING ENCRYPTED USEFUL DATA OBJECTS

CROSS-REFERENCE TO RELATED APPLICATIONS

This application is a continuation of U.S. patent application Ser. No. 10/595,713 filed May 5, 2006, now U.S. Pat. No. 7,835,992 which is a U.S. National Stage Application of International Application No. PCT/EP2004/052494 filed Oct. 11, 2004, which designates the United States of America, and claims priority to DE Application No. 103 51 961.0 filed Nov. 7, 2003, the contents of which are hereby incorporated by reference in their entirety.

FIELD OF TECHNOLOGY

The present invention relates generally to a method for transferring encrypted useful data objects to a telecommunication terminal such as a mobile telephone, for example. In particular, the present invention relates to a method in which the arrival and activation of the encrypted useful data object on the telecommunication terminal is indicated in a user-friendly manner.

BACKGROUND

A method or service for reliably and accountably transferring useful data objects to a telecommunication terminal in a telecommunication network, wherein the telecommunication terminal takes the form of a mobile radio device or mobile telephone, in particular. In this case, the transfer or also downloading of useful data objects onto the mobile radio device is expected to take place using one of the protocols specified by the Open Mobile Alliance (OMA) or an Internet protocol (e.g., Hypertext Transfer Protocol: http). In this case, a service for the transfer can be specified in such a way that a user having an application program available on the mobile radio device (which application program can be designated as a transfer client or as a download client in the case of a simple downloading of data) should be able to transfer any useful data objects that are offered in the data communication network by one or more data provision components (e.g., servers of service providers or content providers).

The WAP Forum and its successor organization the Open Mobile Alliance (OMA) have defined various methods for managing explicit usage rights for digital content of any type, e.g., including multimedia data. In this case, it is planned to equip a useful data object, which is to be transferred, with restrictions or limitations relating to its use by the recipient or user of the mobile radio device. Therefore, the number of uses of the useful data object or also the usage duration can be limited. This is implemented in practice by describing the restrictions using a corresponding language, e.g., ODRL (Open Digital Rights Language) or the OMA DRM Rights Expression Language (REL) specified by the OMA. For the purpose of managing the rights (DRM: Digital Rights Management) associated with a (digital) useful data object, the transfer client or another special application (a so-called DRM agent) receives the rights description, analyzes it, stores it in a protected memory area (which cannot be accessed by the user on the mobile radio device) and in response to a request from the user to use the object either grants or withholds the rights in accordance with the rights description. The useful data object itself can be protected against unauthorized access either by being stored in encrypted form in a freely accessible memory area on the mobile radio device or by being managed by a special application, e.g., the DRM agent, which does not allow any unauthorized access to the object by the user.

In accordance with a variant called "Separate Delivery" which is specified for managing DRM-protected content by the Open Mobile Alliance, a useful data object that is provided by a data provision component is encrypted and packaged into a so-called container file or a so-called container object (which is assigned, e.g., the data type or content type "Application/VND.OMA.DRM.Content") for transporting and storing on a telecommunication terminal such as a mobile radio device. Using a service for reliably transferring contents from a data provision component (content download), the encrypted useful data object which has been packaged into the container object is transferred to the telecommunication terminal by means of WAP protocols (e.g., WSP: Wireless Session Protocol) or Internet protocols (e.g., http). Separately from the encrypted useful data object, a so-called rights object is transferred to the telecommunication terminal via a secure channel and, e.g., automatically by means of WAP Push.

The rights object contains a description of the rights which are granted to the user for using the encrypted useful data object, a reference to the container object (which reference allows an assignment of the rights object to the corresponding container object) and a key with which the encrypted useful data object can be decrypted in order that it can subsequently be used. A special entity or application (which can be the aforementioned DRM agent) is required on the telecommunication terminal (e.g., the mobile radio device, in order to use the combination of the encrypted useful data object which is packaged in the container object and the rights object). Following the transfer of the rights object to the telecommunication entity, the rights object is passed directly to the DRM agent, which is responsible for the management and safeguarding of the secret (i.e., the key for decrypting the encrypted useful data object).

In practical terms, the DRM agent stores the rights object on the telecommunication terminal in such a way that it is protected against unauthorized access by other applications or users. When an encrypted useful data object is to be used, the DRM agent is activated first. The DRM agent searches the memory area which it manages in the telecommunication entity for a rights object that corresponds to the container object (using the identification which is included in the container object and in the rights object), checks whether rights can be granted for the requested type of usage (e.g., a "playback" of music data or a "display" of image data, etc.) and decrypts the useful data object using the key from the rights object if the rights can be granted.

Using the method described above (in which an encrypted useful data object and a separate rights object can be used), the value of digital data is no longer represented by the (encrypted) useful data object or the container object itself (e.g., but rather by the rights object and the key that is contained therein, without which the encrypted useful data object is clearly unusable). Consequently, the encrypted useful data objects which are packaged in the container objects can be stored in a freely accessible manner on the telecommunication terminal.

Since the (encrypted) useful data objects to be transferred can be data objects having multimedia contents (as mentioned above) and consequently involve significant amounts of data, a service offering a substantial transfer capacity is required for a corresponding transfer of such data. For example, a Multimedia Messaging Service (MMS) specified by the 3GPP (3rd Generation Partnership Project), and an OMA capable of performing switching and transfer of multimedia messages to and from mobile communication subscribers.

A combination of both DRM and MMS techniques is, therefore, beneficial. MMS allows valuable digital content to be transferred to other subscribers, wherein the actual usage rights for the content can be defined and transferred likewise. For this, the contents are packaged into the DRM container objects and optionally encrypted (depending on the selected DRM method). The use of the contents can, therefore, be restricted to the addressed recipient/recipients of the MMS message. Therefore, unwanted subsequent circulation resulting from the first recipient simply forwarding a message can be prevented.

Subscriber-based services can be seen as an example for the use of a combination of DRM and MMS. For this, a user places an order with a provider of such a service for the supply of useful data objects (including image contents, audio contents, text contents or other information contents) of any type on the basis of availability (i.e., on a regular basis if specific events occur). For example, a video sequence showing the occurrence in the case of a goal in a football match, a current weather forecast including an image of a weather map and audio information explaining the map, or the like.

As shown in FIG. 1, the provider uses its data provision component DBK (e.g., a data server in the Internet) to send the user, at his or her telecommunication terminal TG1, the desired information in the form of encrypted useful data objects NDO via MMS. For example, the useful data object/objects NDO (which are integrated in a multimedia message MM) reach the telecommunication terminal TG1 via a switching component VK (e.g., taking the form of an MMS switching unit, in Push Mode at time points which the user cannot normally predict and without the user having explicitly to initiate a loading process for the download). This example represent a significant difference in comparison with the so-called Pull Mode, in which the user must always send the provider an explicit request in order to receive a desired useful data object.

In parallel therewith, the rights provider (who can be identical to the aforementioned service provider) uses the data provision component DBK to send the rights object(s) RO assigned to the encrypted useful data object NDO to the telecommunication terminal TG1 of the user (e.g., using WAP Push via a WAP Push Proxy Gateway PPG). This means that useful data object and rights object(s) reach the terminal of the recipient on separate paths and asynchronously. In the telecommunication terminal TG1, the MMS messages MM (which are transferred via the switching component, and in particular include the useful data objects NDO) are received and processed by an MMS user application MUA, and the rights objects RO are received and managed by a DRM agent DA. The MMS user application MUA and the DRM agent DA are interconnected in order that the encrypted useful data object can be activated using the corresponding rights object. The MMS user application MUA and the DRM agent DA can be software applications, which are executed in the telecommunication terminal TG1 by a processing unit (not shown) such as a microprocessor.

As mentioned above, the encrypted useful data objects and the corresponding binary rights objects are transferred on separate independent transport channels. In this case, the transfer is normally unsynchronized relative to time. Only when both objects are present on the receiving terminal can the protected contents of a useful data object be used on the terminal. When using http or the special variant of the Open Mobile Alliance for downloading useful data objects onto mobile terminals (so-called "OMA Download"), the user actively requests a specific useful data object by means of a so-called "http Get-Request," which useful data object is subsequently supplied to the user in the so-called "http Response-Message." When a DRM-protected useful data object is supplied in this way, in addition to the useful data object, the provider can also supply a rights object via Short Message Service (SMS) or WAP Push.

In other words, when receiving DRM-protected useful data objects via MMS and corresponding rights objects in a manner that is unsynchronized relative to time, it was not conventionally possible to adapt the behavior of the telecommunication terminal, specifically to the considerations of DRM. An incoming MMS message MM containing DRM-protected useful data objects NDO is directly signaled to the user in a first receive message via a user interface GUI (cf. FIG. 1), which features (e.g., a display DSP and a loudspeaker LS). If the user opens the message and the required rights objects are not yet present, the use of the useful data object(s) by the user is initially refused by the terminal.

Following the arrival of the corresponding rights object(s), the user is additionally notified in a second receive message that a use of the useful data object in the multimedia message is now possible. This type of information representation on the terminal is relatively unsatisfactory for the user since although the user is initially informed of the arrival of the multimedia message, he or she is not able to use it because the required rights objects have not usually been received (as a result of the useful data object and rights object(s) being received asynchronously relative to time as described above). Only when the user is informed a second time that the required rights objects have also arrived now, can he or she actually use the message. Consequently, the user is unnecessarily informed twice, as well as being reminded on the first occasion that the useful data object is subject to a protection, i.e., certain restrictions.

The present invention, therefore, addresses the problem of producing a user-friendly possibility for signaling the receipt of a usable useful data object on a telecommunication terminal.

SUMMARY

An apparatus and method are proposed for transferring encrypted useful data objects to a first telecommunication terminal includes the following steps. Firstly, at least one encrypted useful data object is transferred to the first telecommunication terminal by a switching component of a telecommunication network. In addition, a time information is transferred to the first telecommunication terminal by the switching component, specifying the time-point by when a rights object will also have arrived at the first telecommunication terminal. The rights object being assigned to the at least one encrypted useful data object and containing the key and the usage rights for the assigned useful data object.

In this case, the time-point can either be specified or indicated in such a way that a concrete absolute time and/or a concrete absolute date, by when an assigned rights object should arrive, is indicated in the time information. Alternatively, it can be specified by means of a subsequent time period within which (up to the last possible time-point) the rights objects can be expected. Next, a rights object which is assigned to the at least one useful data object is received by the first telecommunication terminal. The first telecommunication terminal then checks whether the time-point indicated in the time information has already passed. In the event that it has not yet passed, the terminal outputs a signal (e.g., optical or acoustic) via a user interface with respect to the receipt of a useable useful data object. This means that signaling to the user by the telecommunication terminal only takes place when both the useful data object and the associated matching rights object for activating the useful data object have arrived at the telecommunication terminal (i.e., within the predefined time).

As a result of this delayed signaling, the user only learns that a useable useful data object has arrived on his or her telecommunication terminal when the useable useful data object is present. The user is not even aware beforehand that the useful data object is protected or encrypted and requires a rights object for decryption, which rights object is possibly yet to be supplied to the telecommunication terminal. This user-friendly method for transferring encrypted useful data objects to a telecommunication terminal, and signaling this to a user, makes it possible to gain increased acceptance of the introduction of encrypteduseful data objects. During the check, if the first telecommunication terminal establishes that the time-point specified in the time information has already passed, a configuration provides for it to output a (simple) signal via the user interface to the effect that, although an encrypted useful data object has been received, no rights or rights object for activation is (yet) available.

Furthermore, a predefined time-point or a predefined period (following receipt of the useful data object), which can be set (e.g., by the user of the telecommunication terminal) can be used in the first telecommunication terminal as a criterion indicating until when a rights object may still be validly received without outputting a simple signal. In this case, a definitive last time-point can be a minimal value or maximal value of the two time-points (specified in the time information or preset by the user), i.e., the time-point which is either nearer or further in relation to the receipt of the (encrypted) useful data object.

According to another embodiment of the invention, the proposed method for transferring encrypted useful data objects to the first telecommunication terminal takes place on the basis of the Multimedia Messaging Service (MMS). This allows a transfer of (encrypted) useful data objects which can also include multimedia contents involving significant amounts of data (e.g., digital photographs or video clips).

According to another embodiment of the invention, the at least one encrypted useful data object together with the time information is transferred to the first telecommunication terminal by means of a delivery message. In the case of the MMS, the encrypted useful data object and the time information can be integrated in an MMS delivery message. It is also conceivable for the time information to be transferred separately to the first telecommunication terminal by means of a notification message (by means of an MMS recipient notification in the case of MMS) which specifies that a useful data object is available at the switching component for delivery to the first telecommunication terminal. This last case means that the time information is transferred to the first telecommunication terminal in a first message initially, and that the useful data object is only transferred in a second message subsequently. The relevant notification message and/or delivery message can have a separate header field, to which the time information is assigned as a field value.

According to another embodiment of the invention, the at least one encrypted useful data object can be sent by a data provision component (e.g., a data server of a provider of contents or useful data objects in the telecommunication network), to the switching component for forwarding to the first telecommunication terminal. In this case, the useful data objects can be transferred within the framework of a subscription or another information service. Furthermore, it is also possible for encrypted useful data objects to be sent from a second telecommunication terminal to the switching component for forwarding to the first telecommunication terminal.

According to another embodiment of the invention, the first telecommunication terminal has a time measuring entity or timer which, after receipt of the time information, is instructed by the telecommunication terminal to measure the time until the time-point which is specified in the time information. Furthermore, the first telecommunication terminal can have a communication entity for carrying out the communication with the switching component. In particular, an MMS user application, and a management entity (e.g., a DRM agent) for managing the encrypted useful data objects, which is connected to the communication entity. In this context, following receipt of the at least one encrypted useful data object, the communication entity can ask the management entity whether a rights object is already present for the at least one encrypted useful data object. If not, the communication entity can instruct the time measuring entity to measure the time. According to yet another embodiment of the invention, the at least one encrypted useful data object and the relevant assigned rights object are transferred to the first telecommunication terminal via two different transport channels.

According to another embodiment of the invention, the first telecommunication terminal and possibly further telecommunication terminals as well as the switching component are part of a telecommunication network. In this case, the further telecommunication terminal(s) can be part of a first telecommunication network (e.g., in the case of a plurality of telecommunication terminals, however, these do not have to be part of the same telecommunication network). Correspondingly, the switching component (which is designed in particular as a server of a data transfer service, e.g., an MMS Relay Server) can be provided in a second telecommunication network, which is connected to the telecommunication network (s) that are assigned to the further telecommunication terminal(s).

This second telecommunication network can be implemented in particular as a telecommunication network which is based on Internet protocols such as the Hypertext Transfer Protocol. Moreover, it is conceivable for the data provision component to be provided likewise in the second telecommunication network or in a further telecommunication network which is connected thereto. In order that the method for transferring useful data objects can be used as flexibly as possible, the telecommunication terminal (or even the further telecommunication terminals) can preferably be designed as a mobile telecommunication terminal. In particular, it is conceivable for the data or messages to be sent to and from the first or the further telecommunication terminal via an air interface. In this case, the relevant telecommunication terminal can include a radio module.

The telecommunication terminal can be designed as a mobile telephone, a cordless telephone, a smartphone (combination of a small portable computer and a mobile telephone), a PDA (PDA: Personal Digital Assistant) or an organizer. Furthermore, the telecommunication terminal can also include other devices offering mobile accessibility, such as a personal computer (PC) or a laptop which can be reached via a mobile radio network by means of a connected mobile radio device (mobile telephone or mobile radio module). The mobile radio device can then be connected to the personal computer or laptop via a cable, wirelessly or via an infrared interface or a local Bluetooth network.

As mentioned above, the transfer of data and messages to and from the relevant telecommunication terminal can take place by means of WAP protocols or the Hypertext Transfer Protocol (http). In this case, a telecommunication terminal such as the mobile radio device, including the telecommunication network (which is assigned to said device in the form of a mobile radio network) can function in accordance with the GSM (Global System for Mobile Communications) or the UMTS (Universal Mobile Telecommunications System) standard, or the like. Such mobile radio networks or telecommunication terminals according to the GSM or UMTS standard can provide a platform for WAP protocols or the WAP protocol stack (WAP: Wireless Application Protocol), by means of which data (notifications or useful data objects) can be transferred in the relevant mobile radio network.

The first and the second telecommunication networks are advantageously connected together by means of a connection component. If the WAP protocol stack is used as mentioned above, a connection to this can be established using a WAP gateway as an interface or connection component between a mobile radio network and another network (e.g., a network which is based on the Internet protocol). In this way, it is possible that the switching component is located in a network which is based on an Internet protocol (e.g., the Internet) wherein the data such as messages, useful data objects can be transferred via a WAP gateway and then via an air interface of a mobile radio network between the base station(s) of the mobile radio network and to the relevant telecommunication terminals of users. It should be noted here that, particularly in the context of the MMS data transfer service, messages can be sent by an MMS Relay Server, as part of a switching component, to a telecommunication terminal automatically by means of WAP Push, (i.e., without a request from a telecommunication terminal).

As part of this activity, the MMS Relay Server acts as a so-called Push Initiator which causes the WAP gateway or a subcomponent thereof, namely the Push Proxy Gateway, to send a message to the telecommunication terminal using WAP Push. According to the MMS transfer service, for example, the recipient notification is transferred to the first telecommunication terminal by means of WAP Push. The rights objects are passed directly to the WAP Push Proxy Gateway (PPG) by the data provision component for delivery to the telecommunication terminal. The two transport paths from the data provision component to the telecommunication terminal are, therefore, different for the useful data object and the rights object and are not synchronized relative to time, since the data provision component does not have any direct influence on the delivery of the multimedia message through the switching component to the telecommunication terminal.

According to another embodiment of the invention, the useful data objects can be data in the form of text data, image data or video data, audio data, executable programs or software components or a combination of these data types (i.e., multimedia data or contents). According to yet another embodiment of the invention, a telecommunication arrangement is established which comprises a switching component and a first telecommunication terminal including a user interface, wherein the telecommunication arrangement is designed to carry out a method as described above. Additional features and advantages of the present invention are described in, and will become apparent from, the following Detailed Description, Figures and Tables that follow.

BRIEF DESCRIPTION OF THE FIGURES

FIG. 5 illustrates an MMS message in the form of an MMS recipient notification according to an embodiment of the invention.

FIG. 6 illustrates an MMS message in the form of an MMS delivery message according to an embodiment of the invention.

DETAILED DESCRIPTION

In order to explain the message flow according to a preferred embodiment of the invention between the essential components of a telecommunication terminal (upon receipt of an encrypted useful data object as per FIG. 2), reference is first made to FIG. 1 again, in order to describe the communication environment of the telecommunication terminal.

Figure 1:
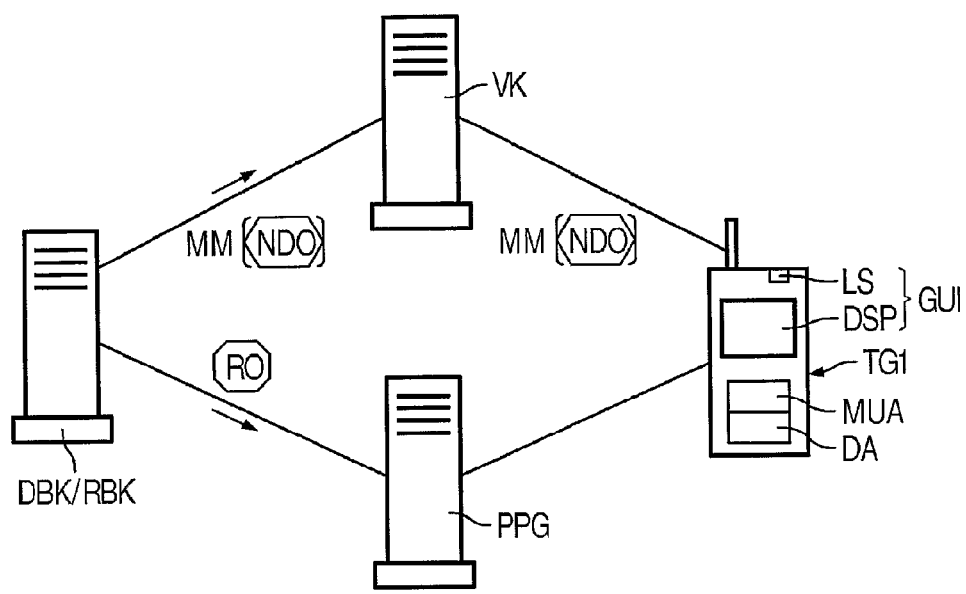
FIG. 1 illustrates a block diagram of an architecture of a telecommunication arrangement for transferring encrypted useful data objects as well as assigned rights objects from a data provision component via a switching component to a telecommunication terminal.

As shown in FIG. 1, the telecommunication arrangement according to a preferred embodiment for carrying out a method for transferring useful data objects by means of the MMS includes a switching component VK, a WAP Push Proxy Gateway PPG and a first telecommunication terminal TG1. In this case, the telecommunication terminal is designed as a mobile telephone, for example, which functions according to the UMTS standard. It is further assumed that the telecommunication terminal TG1, which is designed as a mobile telephone, is part of a mobile radio network. The telecommunication terminal TG1 is capable of using WAP protocols (e.g., Wireless Session Protocol: WSP, etc.) or the WAP protocol stack in order to transfer data via an air interface to a corresponding stationary send/receive arrangement of the mobile radio network, which is assigned to the mobile telephone TG1.

Furthermore, the telecommunication arrangement includes a data provision component DBK of a provider of contents or useful data objects, wherein the data provision component can also function as a "rights provision component" RBK of a provider of rights objects for the relevant useful data objects (the provider of rights objects and the provider of useful data objects can be identical in this case). In this case, the switching component VK, the data provision component DBK and/or the rights provision component RBK can be provided in the mobile radio network which is assigned to the mobile telephone TG1, or can be provided (e.g., in the Internet which is connected to the mobile radio network of the mobile telephone TG1) via corresponding WAP gateways.

Additionally in FIG. 1, the mobile telephone TG1 includes an MMS user application MUA for carrying out the communication with the switching component, in particular according to the MMS, and a DRM component or DRM agent DA for managing the encrypted useful data objects. Furthermore, the mobile telephone TG1 comprises a user interface GUI which includes, e.g., a loudspeaker LS and a display DSP for representing text and/or graphical contents. There follows an explanation of an embodiment of the invention in relation to the receipt and analysis of a received multimedia message and assigned rights objects, as well as the resulting output of information for the user by the mobile telephone TG1.

Figure 2:
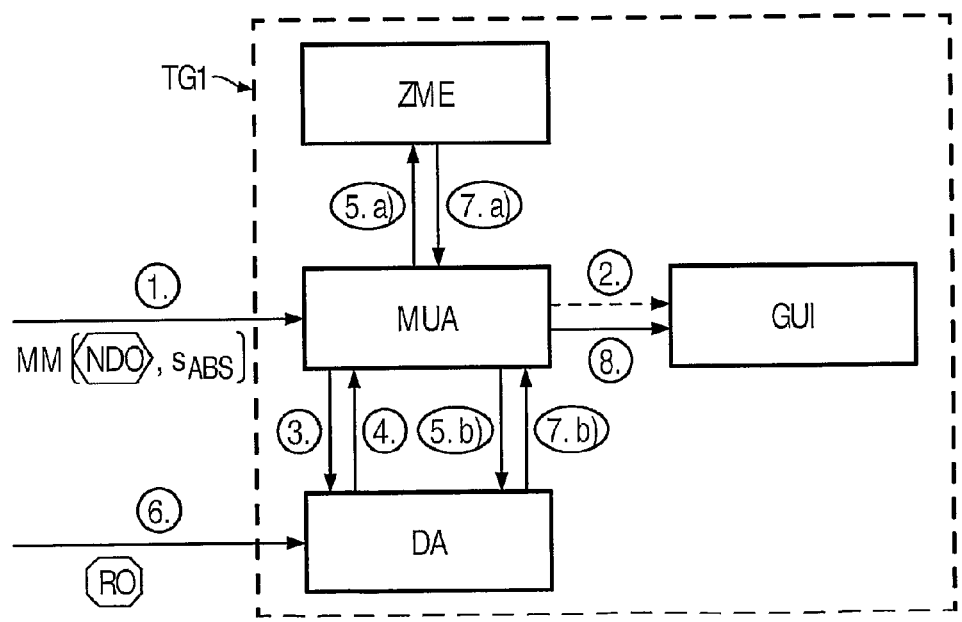
FIG. 2 illustrates a block diagram of the essential components of a telecommunication terminal used for the message flow upon receipt of an encrypted useful data object in accordance with a preferred embodiment of the invention.

With reference to FIG. 2, the logical sequence of the information flow and the control signals in the mobile telephone TG1 (which includes an integrated MMS user application MUA, DRM agent DA and graphical user interface GUI) is described with reference to the numbers in the figure. At step 1, a multimedia message MM including the DRM-protected contents or useful data objects NDO (which are contained therein) is received from the switching component VK by the mobile telephone TG1, and is processed and analyzed by the MMS user application MUA (which is integrated in the mobile telephone TG1). In this case, the MMS user application MUA establishes that the MMS message MM contains DRM-protected content as per the "Separate Delivery" method, i.e., that the contents or useful data objects NDO are embedded in objects or container objects having the MIME type "application/vnd.oma.drm.content."

Furthermore, the MMS user application MUA establishes whether the MMS message MM contains signaling or time information $s_{ABS}$ (e.g., explanation below for FIGS. 5 and 6 in this regard), which indicates a time-linked delivery of the rights object(s) that are required for activation. Both are assumed to be established in the present case. Step 2 shows the behavior of a conventional MMS user application MUA, for better understanding, and is only included for information. The MMS user application MUA then passes the information relating to a received multimedia message MM or a received encrypted NDO to the graphical user interface for display to the user. According to the preferred embodiment of the invention, this behavior is prevented in the case illustrated here. Instead, the further processing takes place as shown below.

At step 3, the MMS user application MUA first asks the DRM agent DA whether corresponding rights objects are already present for the DRM-protected useful data object(s) NDO contained in the multimedia message MM. This can apply, for example, in the case of a subscription relating to useful data objects (e.g., regular transfer of market information or football results), or if the rights objects were already delivered before the multimedia message arrived. At step 4, the DRM agent DA searches for matching rights objects. In the present case, it does not find any and reports this back to the MMS user application MUA.

At step 5a, the MMS user application MUA analyzes the time information $s_{ABS}$ in the information element in the MMS message MM, and starts a time measuring entity or timer ZME using this value. Alternatively, the MMS user application MUA can form a minimal value from $s_{ABS}$ and the upper limit of a time delay for the notification of the user in relation to received messages or useful data objects, and start the timer ZME using this value. At step 5b, the MMS user application MUA starts a function in the DRM agent DA, which function causes the DRM agent DA to send a message to the MMS user application MUA in response to the arrival of rights objects (which allow an access to the DRM-protected useful data objects in the multimedia message MM). The identifier(s) (ContentID) of the DRM-protected useful data objects NDO is/are used as reference parameters. These identifiers are also contained in the assigned rights objects RO. The identifiers therefore allow recognition of the assigned rights objects. The MMS user application MUA then goes into a wait loop, which it leaves again in response to one of the events according to steps 7a or 7b.

At step 6, one or more rights objects RO are received by the mobile telephone TG1, e.g., by means of WAP Push via a WAP Push Proxy Gateway PPG (cf. FIG. 1 again) and passed internally to the DRM agent DA. This takes place before the timer ZME expires in this case. At step 7a, the timer ZME expires and sends a notification of this to the MMS user application MUA. Alternatively, at step 7b, the required rights objects RO were received as per step 6 and the DRM agent DA notifies the MMS user application MUA thereof.

At step 8, the MMS user application then controls the graphical user interface GUI such that it indicates the arrival of a new multimedia message MM (i.e. the arrival of an useful data object NDO). Depending on whether the rights are present, the multimedia message is either indicated as "useable" if the rights objects are present (i.e., case 6. and 7b), or with the advice that activation is still required if the rights objects are not present (i.e., the case 7a). The graphical user interface GUI then outputs the above-mentioned positive (i.e., case 6. and 7b) or negative (i.e., case 7a) information as appropriate, e.g., via the display DSP in the form of a text message or a corresponding symbol and the user can access the message or useful data object in the positive case.

Figure 3:
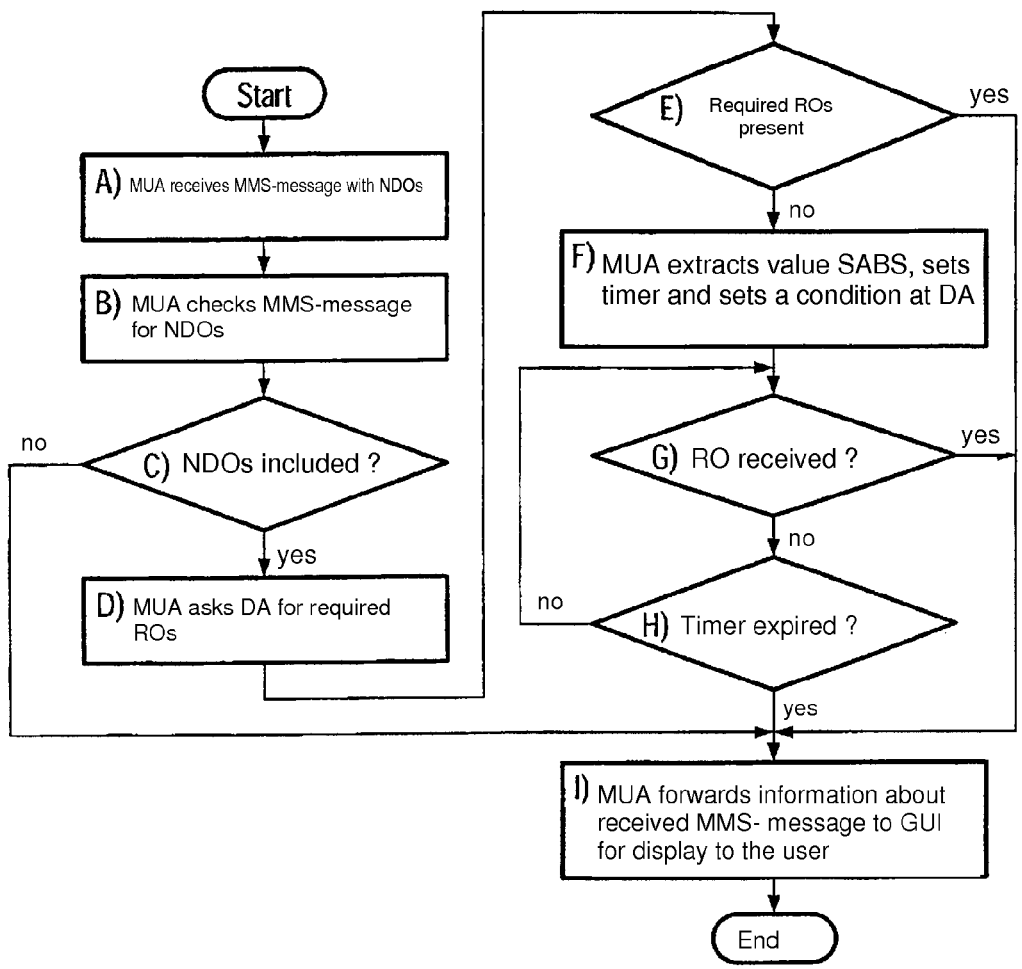
FIG. 3 illustrates a flow diagram of the process sequence in a MMS user application upon receipt of a multimedia message or MMS message including DRM-protected useful data objects.

FIG. 3 illustrates the internal processing and the process sequence in the MMS user application MUA (corresponding to FIG. 1 or 2) upon receipt of an MMS multimedia message MM including DRM-protected useful data objects NDO. The sequence is explained below with reference to the letters designating the process steps. In step A, after the start of the process, the MMS user application MUA receives an MMS message MM which contains DRM-protected useful data objects NDO and a time information $S_{ABS}$ relating to the future delivery of rights objects. In step B, the MMS user application MUA checks whether the MMS message MM contains DRM-protected useful data objects NDO and contains signaling or a time information $s_{ABS}$ indicating that the assigned rights objects RO will be delivered in addition on a separate transport path in the near future.

In step C, if neither condition is met, the sequence jumps to process step I. Otherwise, the processing continues with step D. In step D, the MMS user application MUA asks (if DRM-protected useful data objects are contained) the DRM agent DA whether the rights objects RO (which are assigned to the DRM-protected useful data objects NDO) are already present and receives the information from the DRM agent as a reply. In step E, if the required rights objects RO are already present, the sequence jumps to step I again, otherwise, the process continues with step F.

In step F, the MMS user application extracts the time information or the value $s_{ABS}$ from the corresponding information element of the MMS message MM, if this element is present. If a plurality of these information elements are contained in the MMS message MM (which can occur in the case of a plurality of DRM-protected useful data objects NDO and individual signaling of the separate delivery of rights objects) the MMS user application MUA can reduce the information (e.g., by forming the maximal value or by adding the specified time durations into a single time value $s_{GES}$).

The MMS user application MUA can then reduce the time value to a maximal value, which can be stored in the terminal in an implementation-specific manner and can be adjusted by the user. Using the resulting time value, the MMS user application MUA starts a timer ZME and sets a condition at the DRM agent DA, whereby the DRM agent DA notifies the MMS user application MUA of the arrival of matching rights objects RO (i.e., which are assigned to the DRM-protected useful data objects NDO of the MMS message MM). In step G, the MMS user application MUA checks whether all required rights objects RO for the present MMS message MM have arrived. If yes (i.e., if the DRM agent sent the MMS user application MUA a positive message concerning the arrival of the matching rights objects before expiry of the timer ZME) the process continues at step I, otherwise the process continues at step H. In step H, the MMS user application MUA checks whether the timer ZME has expired. If yes, the process continues at step I, otherwise, the process continues at step G (i.e., the loop is executed again).

In step I, the MMS user application MUA forwards the information concerning the received MMS message MM to the graphical user interface GUI for output to the user. In the positive case, the rights objects RO (which are required for using the MMS message MM) or the useful data objects NDO contained therein are present at this time, and the user can use the message or the useful data objects NDO contained therein. If the required rights objects are not yet present, a message is displayed to the user but no use or only limited use is possible.

In summary, therefore, it can be stated that an essential point of the above-described method for transferring useful data objects to a telecommunication terminal or mobile telephone is the controlled output by the telecommunication terminal of information concerning received multimedia messages or useful data objects and assigned rights objects. An essential aspect is the transfer of contents (useful data objects and rights objects) via two logically separate transport channels to two logically separate functional units (MMS user application and DRM agent), wherein the transfer is not synchronized relative to time.

Further aspects of the invention include the analysis of the incoming multimedia message by the MMS user application MUA for a DRM-protected useful data object NDO, which is contained in the message. Additionally, other aspects of the invention include analysis of the incoming multimedia message MM by the MMS user application MUA for information elements (which are contained in the message and signal a delivery of rights objects for the DRM-protected contents), wherein said delivery can be expected in the near future. The internal communication between MMS user application MUA and DRM agent DA (i.e., the MMS user application MUA asking the DRM agent DA on the telecommunication terminal whether assigned rights objects RO) are already present on the telecommunication terminal for the DRM-protected useful data object(s) NDO contained in the MMS message MM.

Additional aspect of the invention include the internal control of a timer ZME by the MMS user application MUA (i.e., the starting of a timer ZME by the MMS user application MUA). The information element(s) and/or time information (for signaling a forthcoming separate delivery of rights objects RO) contained in the MMS message MM is/are taken into consideration and furthermore a maximal duration of the timer is also taken into consideration, wherein the duration can be implementation-specific and/or can also be selected by the user.

Another embodiment of the invention is directed to the MMS user application MUA waiting for the arrival of the rights object(s) assigned to an MMS message or to individual MM elements, wherein the DRM agent receives and manages the rights objects RO directly, and/or expiry of the timer ZME. Additionally, another embodiment is directed to the delayed output and signaling of the received multimedia message MM including the DRM-protected useful data objects NDO to the graphical user interface GUI of the telecommunication terminal (TG1) if either the required rights are present (or at least one is present) and the user can directly access and use the useful data objects of the multimedia message or alternatively the timer ZME has expired.

Figure 4:
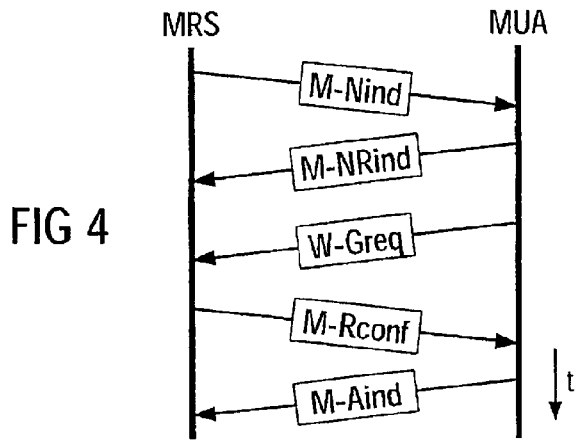
FIG. 4 illustrates a block schematic diagram illustrating the message flow during the delivery of an encrypted useful data object to a telecommunication terminal according to the MMS.

As mentioned above with regard to FIG. 1, the transfer of encrypted or DRM-protected useful data objects from the switching component VK to the telecommunication terminal TG1 can take place by means of MMS. FIG. 4 illustrates the complete message flow for this between the switching component VK, in particular having the form of an MMS switching unit or an MMS relay server MRS in a telecommunication network, and the MMS user application MUA on the telecommunication terminal or mobile telephone TG1.

Firstly, an MMS recipient notification M-Nind is sent from the MRS to the MUA via WAP Push. In the illustrated case, the MUA initially answers the message M-Nind using a confirmation M-NRind for the notification. Subsequently, the MUA sends a download request W-Greq to the MRS. The latter replies using a delivery message M-Rconf, in which is contained the useful data object or multimedia content of the message. Finally, the MUA also confirms the delivery of the multimedia message using the delivery confirmation M-Aind.

The two following examples illustrate the possible embedding of a new header field in an MMS recipient notification M-Nind or in an MMS delivery message M-Rconf in accordance with the invention.

EXAMPLE A

This example is directed to the integration of the additional information element (time information) in the form of a header field into the MMS recipient notification. The integration of an additional information element for the time information into a recipient notification takes place as an additional header field having the name "X-Mms-DRM-Separate-Delivery," for example. Table 1 shows the header fields for an MMS recipient notification, including the new header field "X-Mms-DRM-Separate-Delivery" in accordance with the invention. It should be noted that the field names and field values in the following Table 1 are specified using the original English designations which are known to a person skilled in the art.

TABLE 1

| Field name | Field Value | Description |
| --- | --- | --- |
| X-Mms-Message-Type | Message-type value = m-notification-ind | Mandatory. Designates the type of the MMS-PDU (Packet Data Unit). |
| X-Mms-Transaction-ID | Transaction-id-value | Mandatory. Transaction-ID for identification of the recipient notification (M-Notification.ind or M-Nind) and the corresponding confirmation by the recipient |

TABLE 1-continued

| Field name | Field Value | Description |
| --- | --- | --- |
| X-Mms-Version | MMS-version-value | (M-NotifyResp.ind or M-NRind).<br>Mandatory.<br>The MMS version number. |
| From | From-value | Optional.<br>Address of the last MMS user application which handled the multimedia message, i.e. which either sent or forwarded the multimedia message. |
| Subject | Subject-value | Optional.<br>Subject of the multimedia message. |
| X-Mms-Message-Size | Message-size-value | Mandatory.<br>Data volume of the associated MMS delivery message (M-Rconf) in octets. . . . |
| . . . | . . . | . . . |
| X-Mms-Content-Location | Content-location-value | Mandatory.<br>Reference for downloading the multimedia message. |
| X-Mms-DRM-Separate-Delivery | DRM-Separate-Delivery-value | Optional.<br>Indicates that one or more DRM-protected objects will be contained in the MMS delivery message, and that DRM rights objects will also be transferred to the telecommunication terminal e.g. via WAP Push, wherein optionally the maximal delivery delay or a date/time is also described, by when the delivery will have taken place. |

It should also be noted that, in the case of the MMS recipient notification according to the above embodiment of the invention in Table 1, the new header field is outlined twice. According to the embodiment, the following definitions can be specified for the value of the new header field:

X-*Mms*-DRM-Separate-Delivery=Value-length(Absolute-token Date-value|Relative-token Delta-seconds-value)

Where:
Date-value: date and time by when the required rights object(s) will be transferred to the terminal
Delta-secods-value: number of seconds within which the required rights object(s) will be transferred to the terminal
Absolute-token=<octet 128>
Relative-token=<octet 129>

As a binary token for the encoding of the header field name "X-Mms-DRM-Separate-Delivery", one of the values "0x34", "0x35", "0x36", "0x37", "0x38", "0x39", "0x3A", "0x3B", "0x3C", "0x3D", "0x3E" or "0x3F" is used according to the embodiment. This has the advantage of a more compact representation and a more efficient transfer of the MMS message. On the basis of this explanation, it is now possible in principle for an MMS recipient notification to have the structure illustrated in FIG. 5, wherein the header fields are represented as text for the sake of clarity. However, binary codes are used in the case of a standard-compliant transfer to the telecommunication terminal.

In the example shown in FIG. 5, a header field having the name "X-Mms-DRM Separate-Delivery" is embedded in the MMS recipient notification. The value includes the first information item, indicating the number of subsequent characters in the header field, a second value ("<129>") (which indicates that the following value is a "Delta-seconds-value"), and a third value namely the "Delta-seconds-value" ("300") (which indicates the number of seconds until all associated rights objects should be received). The proposed variant has the advantage that, as soon as the MMS recipient notification has been delivered, it is obvious to the MMS user application that the MMS message will contain DRM-protected objects and a recipient-specific method can be derived from this, according to which (e.g., all messages including DRM-protected useful data objects are immediately downloaded onto the telecommunication terminal, or similar).

Backwards compatibility for MMS user applications without support for the additional DRM functionality is easily possible using the method which is proposed here. According to the OMAIWAP specification, MMS user applications should simply ignore unrecognized header fields and discard their contents.

EXAMPLE B

Integration of the additional information element (time information) in the form of a header field into the MMS delivery message. The following example demonstrates the integration of an additional information element into an MMS delivery message. This is done analogously to Example A. The following Table 2 shows the definition of the claimed new header field "X-Mms-DRM-Separate-Delivery" as illustrated previously in Table 1.

TABLE 2

| Field name | Field value | Description |
| --- | --- | --- |
| . . . | . . . | . . . |
| X-Mms-DRM-Separate-Delivery | DRM-Separate-Delivery-value | Optional.<br>Indicates that one or more DRM-protected objects will be contained in the MMS delivery message, and that DRM rights objects will also be transferred to the telecommunication terminal e.g. via WAP Push, wherein optionally the maximal delivery delay or a date/time is also described, by when the delivery will have taken place. |

The example of a textually encoded MMS delivery message in FIG. 6 is analogous to the MMS recipient notification which is illustrated above, and again contains the claimed new header field "X-Mms-DRM-Separate-Delivery" —this time with a reduced "Delta-seconds-value" due to the somewhat later delivery.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for transferring encrypted data objects to a first telecommunication terminal comprising:
   transferring at least one encrypted data object to the first telecommunication terminal from a switching component of a telecommunication network;
   transferring a time information to the first telecommunication terminal from the switching component, specifying the time-point by when a rights object will also have arrived at the first telecommunication terminal, said rights object being assigned to the at least one encrypted data object and containing the key and the usage rights for the assigned data object;
   the first telecommunication terminal receiving a rights object which is assigned to the at least one data object;
   the first telecommunication terminal not outputting a signal via a user interface which has been assigned to this first telecommunication terminal, said signal concerning the receipt of a data object, until either the time-point specified in the time information has passed or a predefined time-point in the first telecommunication terminal following receipt of the data object has passed, or the at least one rights object which is received for activating the data object has been received.

2. The method as claimed in claim 1, according to which if a rights object is received before the time-point which is specified in the time information or before a predefined time-point in the telecommunication terminal, the user interface outputs a signal concerning the receipt of a useable data object.

3. The method as claimed in claim 1, according to which if the time-point which is specified in the time information or the predefined time-point in the telecommunication terminal is passed before a rights objects is received, the user interface merely outputs a signal concerning the receipt of an encrypted data object.

4. The method as claimed in claim 1, according to which the at least one encrypted data object together with the time information is transferred to the first telecommunication terminal by means of a delivery message.

5. The method as claimed in claim 1, according to which the time information is transferred to the first telecommunication terminal by means of a notification message which specifies that a data object is available at the switching component for delivery to the first telecommunication terminal.

6. The method as claimed claim 1, according to which the at least one encrypted data object is sent by a data provision component of the telecommunication network or by a second telecommunication terminal to the switching component for forwarding to the first telecommunication terminal.

7. The method as claimed in claim 6, according to which the data provision component is designed as a server of a content provider.

8. The method as claimed in claim 1, according to which following receipt of the time information the first telecommunication terminal instructs a time measuring entity, which is assigned to said first telecommunication terminal, to measure the time until the time-point which is specified in the time information or until the time-point which is predefined in the telecommunication device.

9. The method as claimed in claim 1, according to which the first telecommunication terminal has a communication entity for carrying out the communication with the switching component and a management entity, which is connected to the communication entity, for managing the encrypted data objects.

10. The method as claimed in claim 9, according to which following receipt of the at least one encrypted data object, the communication entity asks the management entity whether a rights object is already present for the at least one encrypted data object and, if not, instructs the time measuring entity to measure the time.

11. The method as claimed in claim 1, according to which the at least one encrypted data object and the relevant assigned rights object are transferred to the first telecommunication terminal via two different transport channels.

12. The method as claimed in claim 1, according to which the messages and data are transferred between the switching component and the first telecommunication terminal in the context of the Multimedia Messaging Service.

13. The method as claimed in claim 12, according to which the delivery message is an MMS delivery message and/or the notification message is an MMS recipient notification, wherein the MMS delivery message and/or MMS recipient notification have a separate header field to which the time information is assigned as a field value.

14. The method as claimed in claim 1, according to which data to and from the first and/or second telecommunication terminal is sent via an air interface.

15. The method as claimed in claim 14, according to which the first and/or second telecommunication terminal includes a radio module and is designed in particular as a mobile telephone, a cordless telephone, or a portable computer.

16. The method as claimed in claim 14, according to which the transfer of messages to and from the first and/or second telecommunication terminal takes place by means of WAP protocols or the Hypertext Transfer Protocol (http).

17. The method as claimed in claim 1, according to which the first telecommunication terminal is part of a first telecommunication network.

18. The method as claimed in claim 17, according to which the first telecommunication network is implemented as a mobile radio network which works in particular according to the GSM or UMTS standard.

19. The method as claimed in claim 17, according to which. the switching component is designed as part of a second telecommunication network which is connected to the first telecommunication network, said second telecommunication network being implemented in particular as a telecommunication network which is based on Internet protocols such as the Hypertext Transfer Protocol.

20. The method as claimed in claim 19, according to which the first and the second telecommunication networks are connected together by means of a connection component which is implemented in particular as a WAP gateway.

21. The method as claimed in claim 1, according to which the data object contains text information, audio information, video information, an executable, program, a software module or a combination of these information elements.

22. The method as claimed 1, in claim wherein the data object comprises at least one of text data, image data, video data, audio data, executable programs, software components, and multimedia data.

23. A telecommunication arrangement comprising a switching component and at least one first telecommunication terminal, wherein the telecommunication arrangement is designed to carry out a method comprising:

at least one encrypted data object is transferred to the first telecommunication terminal by a switching component of a telecommunication network;

a time information is transferred to the first telecommunication terminal by the switching component, specifying the time-point by when a rights object will also have arrived at the first telecommunication terminal, said rights object being assigned to the at least one encrypted data object and containing the key and the usage rights for the assigned data object;

the first telecommunication terminal receives a rights object which is assigned to the at least one data object;

the first telecommunication terminal does not output a signal via a user interface which has been assigned to this first telecommunication terminal, said signal concerning the receipt of a data object, until either the time-point specified in the time information has passed or a predefined time-point in the first telecommunication terminal following receipt of the data object has passed, or the at least one rights object which is received for activating the data object has been received.

24. A method for transferring encrypted data objects to a first telecommunication terminal, comprising:

transferring at least one encrypted data object to the first telecommunication terminal by a switching component of a telecommunication network;

transferring a time information to the first telecommunication terminal by the switching component specifying the time-point when a rights object will also have arrived at the first telecommunication terminal, said rights object being assigned to the at least one encrypted data object and containing the key and the usage rights for the assigned data object;

receiving at the first telecommunication terminal a rights object, which is assigned to the at least one data object; and outputting from the first telecommunication terminal a signal via a user interface which has been assigned to this first telecommunication terminal, said signal concerning the receipt of a data object, when either the time-point specified in the time information has passed or a predefined time-point in the first telecommunication terminal following receipt of the data object has passed, or the at least one rights object which is received for activating the data object has been received.

25. The method according to claim 24, wherein if the rights object is received before the time-point which is specified in the time information or before a predefined time-point in the telecommunication terminal, the user interface outputs a signal concerning the receipt of a useable data object.

26. The method according to claim 24, wherein if the time-point which is specified in the time information or the predefined time-point in the telecommunication terminal is passed before a rights objects is received, the user interface merely outputs a signal concerning the receipt of an encrypted data object.

27. The method according to claim 24, wherein at least one encrypted data object together with the time information is transferred to the first telecommunication terminal by means of a delivery message.

28. The method according to claim 24, wherein the time information is transferred to the first telecommunication terminal by means of a notification message which specifies that a data object is available at the switching component for delivery to the first telecommunication.

29. The method according to claim 24, wherein at least one encrypted data object is sent by a data provision component of the telecommunication network or by a second telecommunication terminal to the switching component for forwarding to the first telecommunication terminal.

30. The method according to claim 24, wherein following receipt of the time information the first telecommunication terminal instructs a time measuring entity, which is assigned to said first telecommunication terminal, to measure the time until the time-point which is specified in the time information or until the time-point which is predefined in the telecommunication device.

31. The method according to claim 24, wherein the first telecommunication terminal has a communication entity for carrying out the communication with the switching component and a management entity, which is connected to the communication entity, for managing the encrypted data objects.

32. The method according to claim 31, wherein following receipt of the at least one encrypted data object, the communication entity asks the management entity whether a rights object is already present for the at least one encrypted data object and, if not, instructs the time measuring entity to measure the time.

33. The method according to claim 24, wherein at least one encrypted data object and the relevant assigned rights object are transferred to the first telecommunication terminal via two different transport channels.

34. The method according to claim 33, wherein the messages and data are transferred between the switching component and the first telecommunication terminal in the context of the Multimedia Messaging Service.

35. The method according to claim 34, wherein the delivery message is an MMS delivery message and/or the notification message is an MMS recipient notification, wherein the MMS delivery message and/or MMS recipient notification have a separate header field to which the time information is assigned as a field value.

36. The method according to claim 24, wherein data to and from the first and/or second telecommunication terminal is sent via an air interface.

37. The method according to claim 36, wherein the first and/or second telecommunication terminal includes a radio module and is designed in particular as a mobile telephone, a cordless telephone, or a portable computer.

38. The method according to claim 37, wherein the transfer of messages to and from the first and/or second telecommunication terminal takes place by means of WAP protocols or the Hypertext Transfer Protocol (http).

39. The method according to claim 24, wherein the first telecommunication terminal is part of a first telecommunication network.

40. The method according claim 39, wherein the first telecommunication network is implemented as a mobile radio network which works in particular according to the GSM or UMTS standard.

41. The method according to claims 40, wherein the switching component is designed as part of a second telecommunication network which is connected to the first telecommunication network, said second telecommunication network being implemented In particular as a telecommunication network which is based on Internet protocols such as the Hypertext Transfer Protocol.

42. The method according to claim 41, wherein the first and the second telecommunication networks are connected together by means of a connection component which is implemented in particular as a WAP gateway.

43. The method according to claim 42, wherein the data provision component is designed as a server of a content provider.

44. The method according to claim 43, wherein the data object contains text information, audio information, video information, an executable program, a software module or a combination of these information elements.

45. A telecommunication arrangement comprising a switching component and at least one first telecommunication terminal, wherein the telecommunication arrangement is designed to carry out a method as claimed in the claims 24.

* * * * *